No. 816,369.  
PATENTED MAR. 27, 1906.  
O. F. PERSSON.  
SPEED CHANGING DEVICE.  
APPLICATION FILED JULY 20, 1904.  
3 SHEETS—SHEET 1.
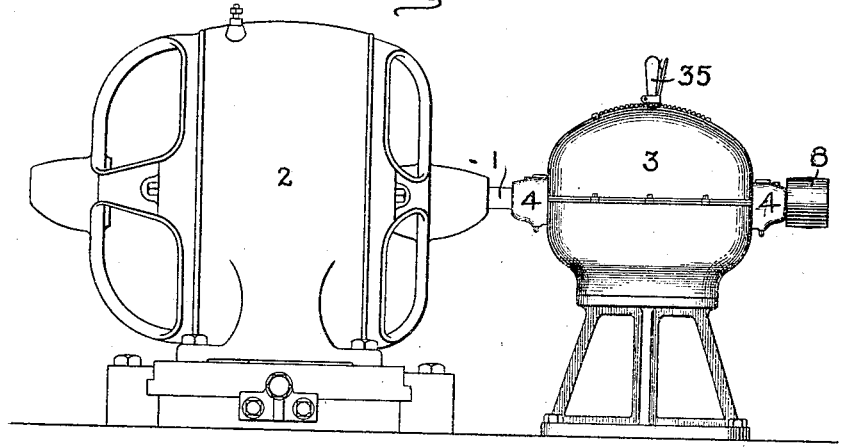
Fig. 1.
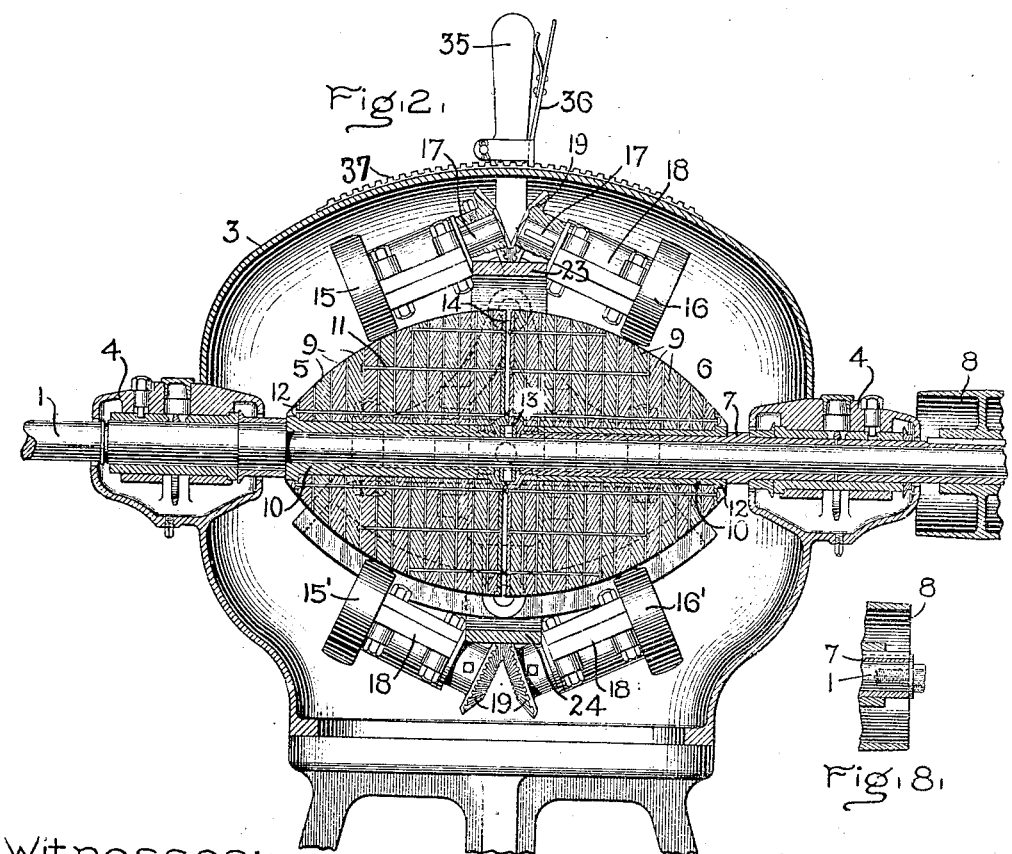
Fig. 2.
Fig. 8.
Witnesses:  
Ennig R Gunney  
Helen Alford
Inventor,  
Otto F. Persson,  
By Albert G. Davis  
Att'y No. 816,369. PATENTED MAR. 27, 1906.
O. F. PERSSON.
SPEED CHANGING DEVICE.
APPLICATION FILED JULY 20, 1904.
3 SHEETS—SHEET 2.
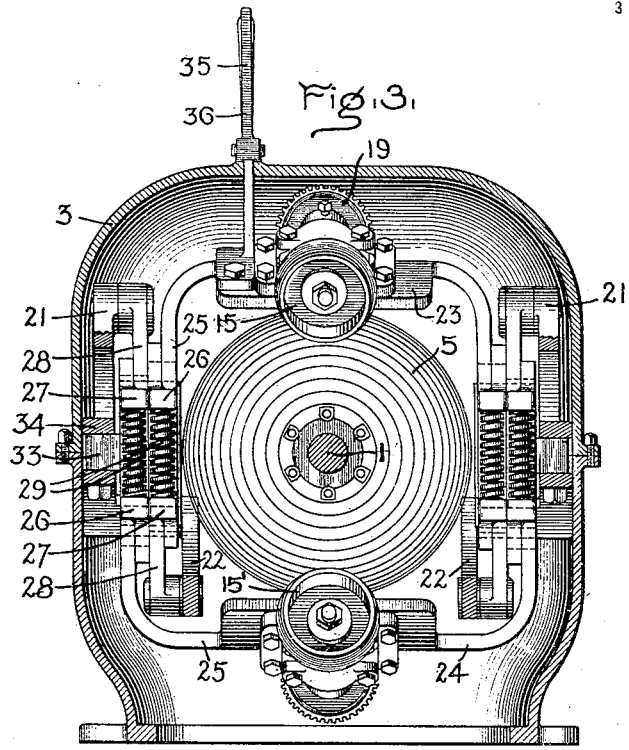
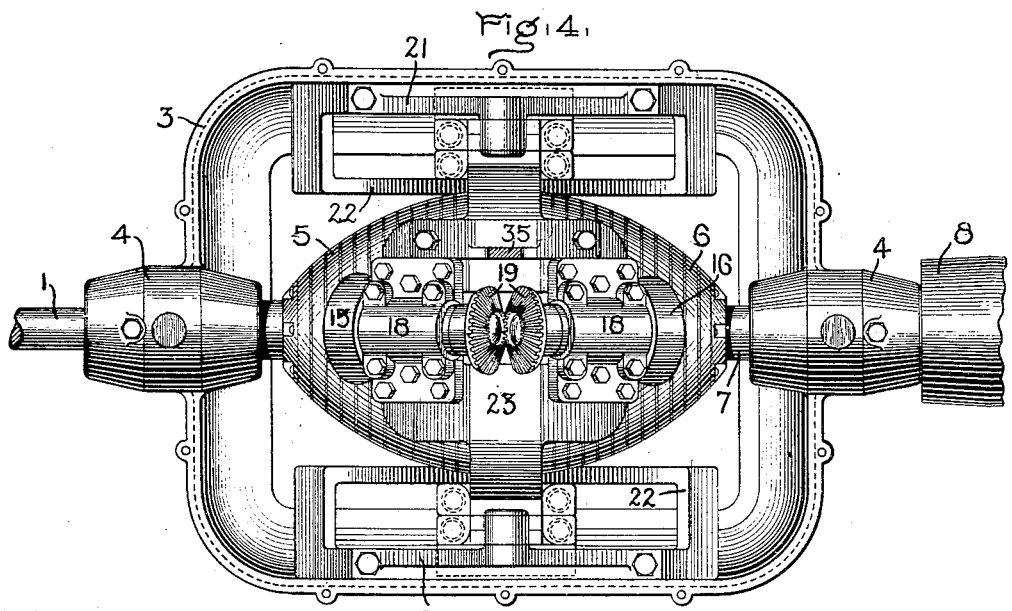
Witnesses:
Inventor,
Otto F. Persson.
By Albert S. Davis
Att'y No. 816,369. PATENTED MAR. 27, 1906.
O. F. PERSSON.
SPEED CHANGING DEVICE.
APPLICATION FILED JULY 20, 1904.
3 SHEETS—SHEET 3.
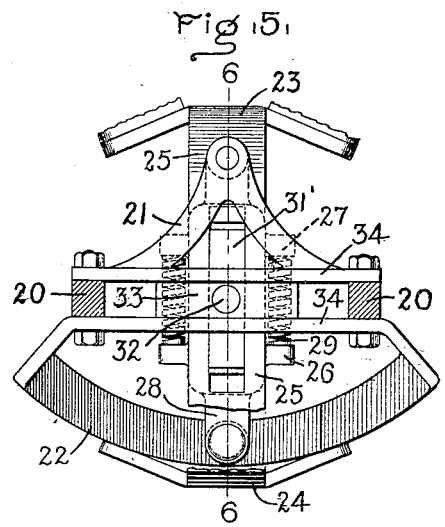
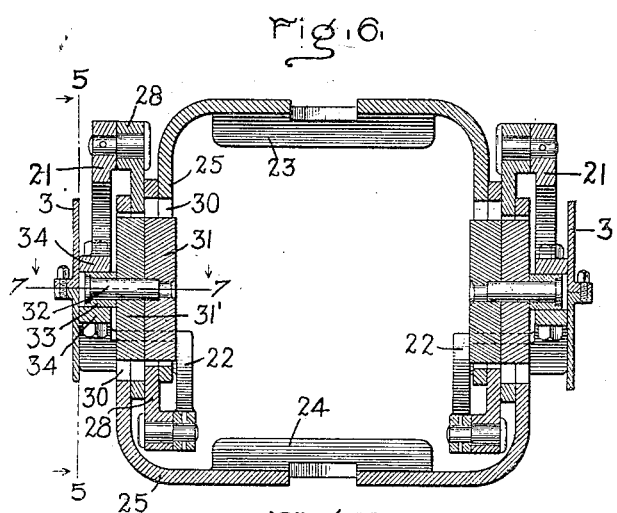
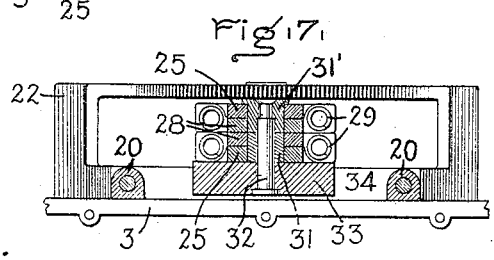
Witnesses:
Erving R. Gurney
Helen Alford
Inventor,
Otto F. Persson,
By Albert H. Davis
Att'y

UNITED STATES PATENT OFFICE.

OTTO F. PERSSON, OF LYNN, MASSACHUSETTS, ASSIGNOR TO GENERAL ELECTRIC COMPANY, A CORPORATION OF NEW YORK.

SPEED-CHANGING DEVICE.

No. 816,369.  Specification of Letters Patent.  Patented March 27, 1906.

Application filed July 20, 1904. Serial No. 217,311.

*To all whom it may concern:*

Be it known that I, OTTO F. PERSSON, a citizen of the United States, residing at Lynn, in the county of Essex and State of Massachusetts, have invented certain new and useful Improvements in Speed-Changing Devices, of which the following is a specification.

This invention relates to mechanism for varying the speed of a driven shaft without altering the speed of the driving-shaft.

It has for its object to provide a mechanism of improved construction which will effectively transmit power at varying speed with minimum loss in transmission.

The nature and scope of my invention will be set forth more fully in the description and in the claims appended thereto.

In the accompanying drawings, Figure 1 is an elevation of an electric motor equipped with my invention. Fig. 2 is a longitudinal sectional elevation of the speed-changing device on a larger scale. Fig. 3 is a cross-sectional elevation of the same. Fig. 4 is a top plan view with the upper half of the casing removed. Fig. 5 is a side elevation on the line 5 5, Fig. 6, of the pinion-shifting levers, partly broken away. Fig. 6 is a vertical cross-section of the same on the line 6 6, Fig. 5. Fig. 7 is a horizontal section on the line 7 7, Fig. 6; and Fig. 8 shows the mode of fastening the pulley to the shaft.

The driving-shaft 1 may be actuated in any suitable manner—as, for instance, by an electric motor 2. The shaft passes longitudinally through a casing 3, divided into upper and lower halves on the horizontal plane of the shaft. The lower half has bearings 4 for the shaft. A friction driving-gear 5 is keyed or otherwise rigidly secured to one half of the shaft inside the casing. A similar gear 6 is firmly secured to a sleeve 7, which is rotatable on the other half of the shaft inside the casing. The sleeve extends outside of the casing and carries a belt-pulley 8 or other means of transmitting its motion to any desired mechanism.

The two friction-gears are conico-hemispherical with their bases adjacent, but not in contact. More accurately speaking, they form together a spindle whose surface is generated by a segment of a circle revolved on its chord, the radius of the circle being preferably equal to the greatest diameter of the spindle. The gears are preferably composed of disks 9, of oak, with the grain running from the center and out, pressed and assembled side by side on a bushing 10 and firmly fastened together, as by rivets 11. The disks are preferably compressed between a collar 12 at one end of the bushing and a flanged nut 13 screwed on the other end thereof. The adjacent ends of the gears are preferably faced with a sheet of metal 14.

One or more pairs of friction-pinions 15 16 15' 16' are engaged, respectively, with the gears 5 6 and are connected together in order to transmit motion from the gear 5 to the gear 6 and its pulley 8. The pinions are preferably secured on short shafts 17, which are journaled in fixed bearings 18, arranged at an angle with each other. The shafts are connected in any suitable manner—as, for instance, by bevel-gears 19. The pinions in each pair are spaced apart about the length of one of the gears 5 or 6, so that they can be shifted along said gears to vary their points of contact therewith, one approaching the larger end of its gear as the other approaches the smaller end of the other gear, and vice versa. By this means the relative speeds of the two gears will be varied, though the absolute speed of the driving-gear 5 remains constant.

If only one pair of pinions is used, it is simply necessary to mount them on a lever fulcrumed on an axis concentric with the curve of the conoidal gears; but I prefer to use two pairs of pinions, one above and the other below the gears, and in order to move both pairs simultaneously in the same direction they must be supported and connected in a certain manner, as will now be described.

On the inside of the lower half of the casing are lugs 20, to which are firmly bolted the bridges 21 and the hangers 22. The bearings 18 for the upper pair of pinions 15 16 are fastened to a lever 23, preferably a bifurcated lever, whose legs are fulcrumed to the hangers. The lower pair of pinions 15' 16' is supported by a lever 24, preferably a U-shaped lever, whose arms are fulcrumed to the bridges. In each case the axis of the fulcrum is concentric with the curve of the gears. In order to press the pinions constantly against the surface of the gears, the legs of the upper lever and the arms of the lower lever are made in two parts overlapping each other. On one part 25 are lugs 26, which face lugs 27 on the other part 28, and between each pair of lugs is a helical spring 29 under compression. These springs constantly pull the upper pinions downward and lift the lower pinions upward against the surfaces of the gears 5 6. To keep the parts 25 28 in alinement, they are preferably provided with longitudinal registering slots 30, in which fits a block 31 31', the two blocks on each side being pivotally supported at their middle points on a pin 32, projecting inwardly from a slide 33, fitting between horizontal guide-bars 34, secured to the lugs 20. A hand-lever 35 is secured to the upper lever 23 and projects through a slot in the upper half of the casing. It is provided with a latch 36, coöperating with a notched quadrant 37 on the top of the casing, so that the pinions can be adjusted to any desired position.

The operation of the device is as follows: With the parts standing as shown in Fig. 2 the pinions bear on equal diameters of the gears, so that the speed of the pulley 8 is the same as that of the driving or motor shaft. By moving the lever 35 to the right (in Figs. 1 and 2) the upper lever 23 turns on its fulcrums in the hangers 22 and carries the blocks 31 31' and the slides 33 to the right. As the blocks 31' engage with the arms of the lower lever 24 the latter is also moved to the right, turning on its fulcrums in the bridges 21. The result of this action is to shift both pairs of pinions to the right in Fig. 1, so that the pinions 15 15' will engage with a larger diameter of the gear 5, while the pinions 16 16' will move out to a smaller diameter of the gear 6. This will cause the pulley 8 to run faster than the motor-shaft. A movement of the lever 35 to the left from its position in Figs. 1 and 2 will cause the pulley 8 to run slower than the motor-shaft. The change can be made while the motor is running, and thus the speed of the pulley can be varied within wide limits without altering the speed of the motor. The device is therefore especially useful in connection with induction-motors, which give the best efficiency at a given constant speed.

What I claim as new, and desire to secure by Letters Patent of the United States, is—

1. In a speed-changing device, the combination with two conoidal friction-gears independently rotatable on a common axis with their bases adjacent, of a pair of connected pinions engaging respectively with said gears, and means for moving said pair of pinions lengthwise of said gears.

2. In a speed-changing device, the combination with two conoidal friction-gears independently rotatable on a common axis with their bases adjacent, of two pairs of connected pinions engaging respectively with said gears, and means for simultaneously moving both pairs of pinions lengthwise of said gears and in the same direction.

3. In a speed-changing device, the combination with a shaft, of a conoidal friction-gear secured thereto, a sleeve rotatable on said shaft, a conoidal friction-gear secured on said sleeve with its base adjacent to that of the other gear, one or more pairs of connected pinions engaging with said gears, and means for moving them lengthwise thereof.

4. In a speed-changing device, the combination with two conoidal friction-gears independently rotatable on a common axis with their bases adjacent, of a lever fulcrumed at a point concentric with the curve of said gears, and a pair of connected pinions mounted on said lever and engaging with said gears.

5. In a speed-changing device, the combination with two conoidal friction-gears independently rotatable on a common axis with their bases adjacent, of a lever fulcrumed at a point concentric with the curve of said gears, two short shafts mounted on said lever at an angle with each other, pinions mounted on the shafts which engage respectively with said gears, and means connecting said shafts.

6. In a speed-changing device, the combination with two conoidal friction-gears independently rotatable on a common axis with their bases adjacent, of a lever fulcrumed at a point concentric with the curve of said gears, two short shafts mounted on said lever at an angle with each other, a pinion on each shaft engaging with a gear, and bevel-gears connecting the adjacent ends of said shafts.

7. In a speed-changing device, the combination with two conoidal friction-gears independently rotatable on a common axis with their bases adjacent, of two levers fulcrumed on opposite sides of said axis at points concentric with the curve of the gears, pairs of pinions carried by said levers and engaging with said gears, and connections between said levers whereby both move simultaneously in the same direction lengthwise of said gears.

8. In a speed-changing device, the combination with two conoidal friction-gears independently rotatable on a common axis with their bases adjacent, of two levers pivoted on opposite sides of said axis at points concentric with the curve of the gears, pairs of pinions carried by said levers and engaging with said gears, a slide movable in a line transverse to the line joining the two pivots, and blocks pivoted to said slide and engaging with said levers.

9. In a speed-changing device, the combination with two conoidal friction-gears independently rotatable on a common axis with their bases adjacent, of two levers pivoted on opposite sides of said axis and provided with longitudinal slots, guide-bars extending perpendicular to the line joining the pivots, a slide movable between said bars, blocks fitting in the slots in the levers and pivoted to said slide, and pairs of pinions carried by said levers and engaging with said gears.

10. In a speed-changing device, the combination with a casing, of a shaft journaled therein, two conoidal friction-gears, one fast and the other loose on said shaft, a bridge and a hanger secured to the inside of the casing, a lever pivoted to the bridge, a pair of pinions carried thereby which engage the under side of the gears, a lever pivoted to the hanger, a pair of pinions on the latter lever which engage the upper side of the gears, and connections between said levers.

11. In a speed-changing device, the combination of two overlapping members, each provided with lateral lugs, compression-springs seated between said lugs, and means for keeping the two members in line.

In witness whereof I have hereunto set my hand this 1st day of July, 1904.

OTTO F. PERSSON.

Witnesses:
DUGALD McK. McKILLOP,
JOHN A. McMANUS.